US009883444B2

(12) United States Patent
Zhao et al.

(10) Patent No.: US 9,883,444 B2
(45) Date of Patent: Jan. 30, 2018

(54) METHOD AND DEVICE FOR EVALUATING NETWORK PERFORMANCE

(71) Applicant: Huawei Technologies Co., Ltd., Shenzhen (CN)

(72) Inventors: Dong Zhao, Shenzhen (CN); Ping Song, Shenzhen (CN); Kai Zhang, Shenzhen (CN); Lan Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 14/334,290

(22) Filed: Jul. 17, 2014

(65) Prior Publication Data

US 2014/0329528 A1    Nov. 6, 2014

Related U.S. Application Data

(63) Continuation of application No. PCT/CN2013/070068, filed on Jan. 5, 2013.

(30) Foreign Application Priority Data

Jan. 19, 2012    (CN) .......................... 2012 1 0018132

(51) Int. Cl.
*H04W 36/00* (2009.01)
*H04W 36/30* (2009.01)
(Continued)

(52) U.S. Cl.
CPC ........... *H04W 36/30* (2013.01); *H04W 24/02* (2013.01); *H04W 24/08* (2013.01); *H04W 36/0083* (2013.01)

(58) Field of Classification Search
CPC ...... H04W 24/00; H04W 24/02; H04W 24/08
(Continued)

(56) References Cited

U.S. PATENT DOCUMENTS

| 6,397,268 B1 * | 5/2002 | Cepulis ................ G06F 9/4411 710/104 |
| 9,031,591 B2 * | 5/2015 | Ma ........................ H04W 16/10 455/450 |

(Continued)

FOREIGN PATENT DOCUMENTS

| CN | 101511093 A | 8/2009 |
| CN | 101557621 A | 10/2009 |

(Continued)

OTHER PUBLICATIONS $3^{rd}$ Generation Partnership Project; Technical Specification Group Services and System Aspects; Telecommunication management; Performance Management (PM); Concepts and requirements (Release 10). 3GPP TS 32.401, V10.2.0, Dec. 2011, 29 pgs.

(Continued)

*Primary Examiner* — Joseph Arevalo
(74) *Attorney, Agent, or Firm* — Brinks Gilson & Lione (57) ABSTRACT

The present application provides a method and device for evaluating network performance, which relate to the field of communications technologies. The method includes: obtaining statistical data characterizing network performance; according to the statistical data, obtaining performance of neighbor relationship adjustment, or obtaining a degree to which the neighbor relationship adjustment affects the network performance. The present application determines impact of ANR algorithm on a network or a UE by collecting related status data, and solves a problem that whether degradation of UE performance or user experience is caused by the ANR algorithm cannot be determined in the prior art. Then a factor of ANR operation may be excluded from numerous factors which may affect a system or user experience, analysis capability of automatic troubleshooting is (Continued)

improved, and problem solving capability of operators is improved.

18 Claims, 3 Drawing Sheets

(51) Int. Cl.
  *H04W 24/02* (2009.01)
  *H04W 24/08* (2009.01)
(58) Field of Classification Search
  USPC .......... 455/456.1, 436, 411, 405, 446, 456.2, 455/45.1
  See application file for complete search history.

(56) References Cited

U.S. PATENT DOCUMENTS

| | | | |
|---|---|---|---|
| 2008/0097799 A1* | 4/2008 | Scribner | G06Q 50/14 705/5 |
| 2008/0285596 A1* | 11/2008 | Hady | H04L 12/2803 370/503 |
| 2009/0254572 A1* | 10/2009 | Redlich | G06Q 10/06 |
| 2009/0325625 A1 | 12/2009 | Hugl et al. | |
| 2010/0227603 A1 | 9/2010 | Gupta et al. | |
| 2010/0234027 A1 | 9/2010 | Han et al. | |
| 2010/0250497 A1* | 9/2010 | Redlich | F41H 13/00 707/661 |
| 2010/0331025 A1* | 12/2010 | Kallin | H04J 11/0069 455/500 |
| 2011/0159901 A1* | 6/2011 | Frenger | H04L 5/0082 455/502 |
| 2012/0069131 A1* | 3/2012 | Abelow | G06Q 10/067 348/14.01 |
| 2012/0099442 A1* | 4/2012 | Bakker | H04W 76/021 370/242 |
| 2012/0110305 A1* | 5/2012 | Lien | G06F 9/3012 712/200 |
| 2013/0058269 A1* | 3/2013 | Xia | H04W 52/0206 370/311 |
| 2013/0166738 A1* | 6/2013 | Ivershen | H04L 67/02 709/224 |
| 2013/0272132 A1* | 10/2013 | Heo | H04W 28/02 370/236.2 |
| 2014/0031047 A1* | 1/2014 | Jovanovic | H04W 16/04 455/446 |
| 2016/0323077 A1* | 11/2016 | Yin | H04W 72/04 |

FOREIGN PATENT DOCUMENTS

| | | |
|---|---|---|
| CN | 101594631 A | 12/2009 |
| EP | 2487951 A1 | 8/2012 |
| WO | WO 2011/050753 A1 | 5/2011 |

OTHER PUBLICATIONS

Lte, "3$^{rd}$ Generation Partnership Project; Technical Specification Group Radio Access Network; Evolved Universal Terrestrial Radio Access (E-UTRA) and Evolved Universal Terrestrial Radio Access Network (U-TRAN); Overall description" Stage 2, (Release 8), 3GPP TS 36.300, V8.8.0, Mar. 2009, 158 pages.

NGMN, "NGMN Recommendation on Son & O&M Requirements" Version 1.23, Dec. 5, 2008, 40 pages.

* cited by examiner

METHOD AND DEVICE FOR EVALUATING NETWORK PERFORMANCE

CROSS-REFERENCE TO RELATED APPLICATIONS

This application is a continuation of International Application No. PCT/CN2013/070068, filed on Jan. 5, 2013, which claims priority to Chinese Patent Application No. 201210018132.8, filed on Jan. 19, 2012, both of which are hereby incorporated by reference in their entireties.

TECHNICAL FIELD

The present application relates to the field of communications technologies, and more particularly to a method and device for evaluating network performance.

BACKGROUND

An automatic neighbor relation (Automatic Neighbor Relation, ANR) adjustment algorithm is a technology that may automatically discover, add and delete a neighbor cell. The algorithm relates to multiple conditions triggering, may also be triggered regularly, and the algorithm has already been widely applied to automatic configuration and optimization of networks at present. When a base station finds that a neighbor cell change, the base station handles a neighbor relationship table (Neighbor Relationship Table, NRT) or a neighbor cell list (Neighbor Cell List, NCL) to ensure the accuracy of a neighbor relationship, so that a terminal may be normally handed over between different cells.

The ANR algorithm will affect performance of a UE and user experience during adjustment or configuration of the neighbor relationship, but whether degradation of terminal performance or user experience is caused by the ANR algorithm cannot be determined in the prior art.

SUMMARY

In order to solve the problem that whether the degradation of UE performance or user experience is caused by the ANR algorithm cannot be determined in the prior art, embodiments of the present application provide a method and device for evaluating network performance. The technical solutions are as follows:

in one aspect, a method for evaluating network performance is provided, and the method includes: obtaining statistical data characterizing network performance; and obtaining performance of neighbor relationship adjustment according to the statistical data, or obtaining a degree to which the neighbor relationship adjustment affects the network performance according to the statistical data.

In another aspect, a device for evaluating network performance is provided, and the device includes: a data obtaining module, configured to obtain statistical data characterizing network performance; and a performance obtaining module, configured to obtain performance of neighbor relationship adjustment according to the statistical data, or obtain a degree to which the neighbor relationship adjustment affects the network performance according to the statistical data.

According to the aforementioned technical solutions, the statistical data characterizing the network performance is obtained, and the performance of the neighbor relationship adjustment or the degree to which the neighbor relationship adjustment affects the network performance is obtained according to the statistical data, so that impact of ANR algorithm on a network or a UE is determined by collecting related status data, the problem that whether the degradation of the UE performance or the user experience is caused by the ANR algorithm cannot be determined in the prior art is solved, then a factor of ANR operation may be excluded from numerous factors which may affect a system or user experience, analysis capability of automatic troubleshooting is improved, and problem solving capability of operators is improved.

BRIEF DESCRIPTION OF DRAWINGS

In order to illustrate the technical solutions in the embodiments of the present application more clearly, accompanying drawings needed for describing the embodiments are introduced briefly in the following. Obviously, the accompanying drawings in the following description are some embodiments of the present application, and persons of ordinary skill in the art may further obtain other accompanying drawings according to these accompanying drawings without making creative efforts.

DESCRIPTION OF EMBODIMENTS

To make objectives, technical solutions and advantages of the present application clearer, embodiments of the present application are hereinafter described in detail, with reference to accompanying drawings.

Embodiment 1

Figure 1:
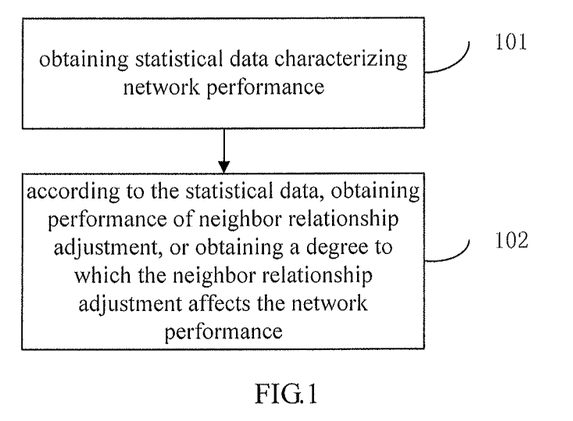
FIG. 1 is a schematic flow chart of a method for evaluating network performance according to embodiment 1 of the present application.

Please refer to FIG. 1, a method for evaluating network performance is provided in the embodiment. The method includes:

101, obtaining statistical data characterizing network performance.

Optionally, obtaining the statistical data characterizing the network performance includes:

receiving telephone traffic data, neighbor relationship data or coverage data reported by a user equipment (UE), or collecting telephone traffic data, neighbor relationship data or coverage data from a network element, and obtaining the statistical data characterizing the network performance according to the telephone traffic data, the neighbor relationship data or the coverage data;

or, receiving the statistical data characterizing the network performance, which is reported by a UE and/or a network element, wherein the statistical data are obtained by the UE and/or the network element according to telephone traffic data, neighbor relationship data or coverage data.

In this embodiment, optionally, the statistical data is obtained by the UE through measurement and calculation, and then reported to a network side by the UE, wherein, after the UE reads the statistical data, the statistical data is stored in the UE, and after the UE is connected to a network, the statistical data is reported to the network side; or when the UE is connected to a network, the statistical data is obtained by the UE through measurement and calculation, and reported to the network side.

In this embodiment, the statistical data includes one or more of the following data: the number of PCI (physical cell identifier) conflict cells, the number of unknown PCIs triggered by an event or periodically, the number of new unknown neighbor cells triggered by an event, the number of successful handover of a new unknown neighbor cell, the number of handover target cells as conflict cells, the number of overshoot coverage cells, the number of reading a GCI (global cell identity), the number of successfully reading a GCI, the number of UEs specified to perform automatic neighbor relationship measurement, delay or average delay of reading a GCI, the number of neighbor cells in a neighbor cell list (NCL), and the number of neighbor relationship tables (NRTs).

102, according to the statistical data, obtaining performance of neighbor relationship adjustment, or obtaining a degree to which the neighbor relationship adjustment affects the network performance.

Optionally, in this embodiment, obtaining the performance of the neighbor relationship adjustment according to the statistical data includes: obtaining the performance of the neighbor relationship adjustment according to first statistical data in the statistical data.

The first statistical data includes one or more data of the number of PCI conflict cells, the number of unknown PCIs triggered by an event or periodically, the number of handover target cells as conflict cells, the number of successful handover of a new unknown neighbor cell, the number of overshoot coverage cells, the number of neighbor cells in an NCL, the number of NRTs, and the number of reading a GCI.

Optionally, in this embodiment, obtaining the degree to which the neighbor relationship adjustment affects the network performance according to the statistical data includes: obtaining the degree to which the neighbor relationship adjustment affects the network performance according to second statistical data in the statistical data.

Further, obtaining the degree to which the neighbor relationship adjustment affects the network performance according to the second statistical data in the statistical data includes: obtaining difference between impact of the neighbor relationship adjustment on the network performance and impact of another self-organizing network optimization on the network performance according to the second statistical data in the statistical data, wherein the second statistical data includes one or more data of the number of PCI conflict cells, the number of unknown PCIs triggered by an event or periodically, the number of handover target cells as conflict cells, the number of successful handover of a new unknown neighbor cell, the number of overshoot coverage cells, the number of reading a GCI, and the number of successfully reading a GCI.

Optionally, in this embodiment, the method also includes:

when the second statistical data includes one or more data of the number of PCI conflict cells, the number of handover target cells as conflict cells, the number of new unknown neighbor cells triggered by an event, and the number of unknown PCIs triggered by an event and periodically, according to the second statistical data, obtaining difference between impact of the neighbor relationship adjustment on a network and impact of a mobility optimization function on the network, or determining that a problem of the network performance is caused by the neighbor relationship adjustment or mobility adjustment.

Optionally, in this embodiment, the obtaining the degree to which the neighbor relationship adjustment affects the network performance according to the second statistical data in the statistical data specifically includes: obtaining an evaluation parameter of impact of the neighbor relationship adjustment on UE performance, user experience or user quality of service according to the second statistical data, wherein the second statistical data includes one or more data of the number of overshoot coverage cells, the number of reading a GCI, the number of successfully reading a GCI, the delay or average delay of reading a GCI, and the number of UEs specified to perform automatic neighbor relationship measurement.

In this embodiment, one or more data in the statistical data may form a preset condition for measuring whether the neighbor relationship adjustment achieves an operating requirement target or meets a specified requirement of the neighbor relationship adjustment; according to the preset condition, whether the neighbor relationship adjustment achieves the operating requirement target is judged, or a degree to which the neighbor relationship adjustment meets the specified requirement is measured; and if the operating requirement target is achieved or the specified requirement is met, the neighbor relationship adjustment is terminated, otherwise, the neighbor relationship adjustment is activated, or the neighbor relationship adjustment which has been started is continued.

Optionally, in this embodiment, when the statistical data includes one or more indicators of the number of PCI conflicts, the number of unknown PCIs triggered by an event or periodically, the number of new unknown neighbor cells triggered by a event, the number of handover target cells as conflict cells, the number of overshoot coverage cells, the number of reading a GCI, and the number of successfully reading a GCI, the method also includes:

when specified data in the statistical data exceeds a first preset condition, terminating neighbor relationship adjustment algorithm;

when the specified data in the statistical data is lower than the first preset condition, activating the neighbor relationship adjustment algorithm, or continuing the neighbor relationship adjustment algorithm.

Optionally, in this embodiment, when the statistical data includes one or more indicators of the number of overshoot coverage cells, the number of reading a GCI, the number of successfully reading a GCI, the delay and/or average delay of reading a GCI, and the number of UEs specified to perform automatic neighbor relationship measurement, the method also includes:

when specified data in the statistical data exceeds a second preset condition, terminating the neighbor relationship adjustment algorithm;

when the specified data in the statistical data is lower than the second preset condition, activating the neighbor relationship adjustment algorithm, or continuing the neighbor relationship adjustment algorithm.

Optionally, in this embodiment, when the statistical data includes the number of successful handover of a new unknown neighbor cell, the number of neighbor cells in an NCL and the number of NRTs, the method also includes:

when specified data in the statistical data is lower than a third preset condition, terminating the neighbor relationship adjustment algorithm;

when the specified data in the statistical data exceeds the third preset condition, activating the neighbor relationship adjustment algorithm, or continuing the neighbor relationship adjustment algorithm.

Optionally, in this embodiment, the statistical data is a self-organizing network target (SON target) or the statistical data is a statistical item of performance measurement (PM).

This embodiment has the following beneficial effects: the statistical data characterizing the network performance is obtained, and the performance of the neighbor relationship adjustment or the degree to which the neighbor relationship adjustment affects the network performance is obtained according to the statistical data, so that impact of ANR algorithm on a network or a UE is determined by collecting related status data, and a problem that whether degradation of UE performance or user experience is caused by the ANR algorithm cannot be determined in the prior art is solved, then a factor of ANR operation may be excluded from numerous factors which may affect a system or user experience, analysis capability of automatic troubleshooting is improved, and problem solving capability of operators is improved.

Embodiment 2

Figure 2:
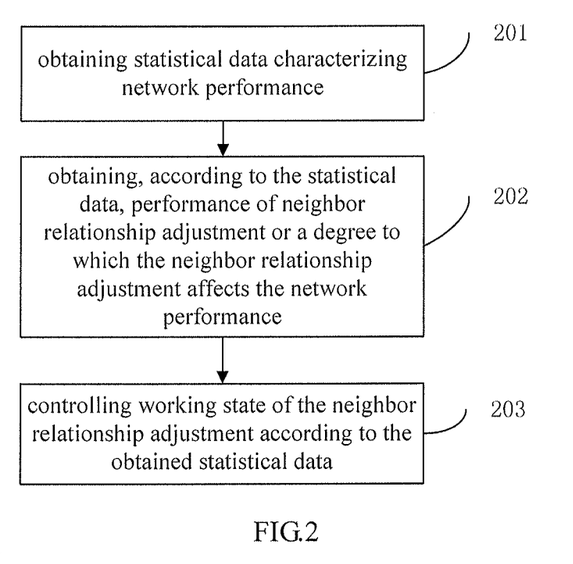
FIG. 2 is a schematic flow chart of a method for evaluating network performance according to embodiment 2 of the present application.

Please refer to FIG. 2, a method for evaluating network performance is provided in the embodiment, and the method includes:

201, obtaining statistical data characterizing network performance.

In this embodiment, the obtaining the statistical data characterizing the network performance includes: receiving original data of telephone traffic data, neighbor relationship data or coverage data reported by a UE, and obtaining the statistical data characterizing the network performance according to the original data of the telephone traffic data, the neighbor relationship data or the coverage data; or, collecting original data of telephone traffic data, neighbor relationship data or coverage data from a network element, and obtaining the statistical data characterizing the network performance according to the original data of the telephone traffic data, the neighbor relationship data or the coverage data; or, receiving the statistical data characterizing the network performance, which is reported by a UE and/or a network element.

In this embodiment, in one aspect, an EMS (element management system) collects original data characterizing the network performance from an eNB and perform calculation to obtain the statistical data characterizing the network performance, wherein the original data characterizing the network performance includes data related to telephone traffic, data related to neighbor relationship, data related to coverage, or the like, which is not limited in this embodiment. In another aspect, the EMS indirectly calculates UE service experience data and performance statistical data from data directly reported by the UE, data characterizing the network performance forwarded through the eNB or data characterizing the network performance reported by the eNB. The EMS reports the collected and calculated data to an NMS (network management system), and these data are used for indicating the performance of ANR operation or how much the ANR affects user experience to an operator. The method for obtaining the statistical data characterizing the network performance in this embodiment may be: directly obtaining the statistical data from the network element, reporting the statistical data by the UE, or obtaining the statistical data from the original collected data through a secondary calculation performed by the EMS or NMS, which is not specifically limited in this embodiment. Optionally, in this embodiment, the statistical data is obtained by the UE through measurement and calculation, and then reported to a network side by the UE, wherein after the UE reads the statistical data, the statistical data is stored in the UE, and after the UE is connected to a network, the statistical data is reported to the network side; or when the UE is connected to a network, the statistical data is obtained by the UE through measurement and calculation, and reported to the network side.

In this embodiment, a specific algorithm for obtaining the statistical data characterizing the network performance may adopt a performance statistics and periodically monitor the statistics by using a PM structure of a network management, or may adopt a UE measured value directly reported by a UE and finally reported to a network management system. Performance data may be reported from the network element (such as a NodeB or an RNC), and specifically, a corresponding counter for counting the required data may be configured on the network element (such as a Node or an RNC).

202, obtaining, according to the statistical data, performance of neighbor relationship adjustment or a degree to which the neighbor relationship adjustment affects the network performance.

In this embodiment, the statistical data characterizing the network performance, which is obtained in step 201, includes data related to telephone traffic, coverage or neighbor relationship adjustment, these data is analyzed to find the statistical data related to the neighbor relationship adjustment, and the performance about neighbor relationship adjustment is further obtained according to the performance statistical data of the neighbor relationship adjustment, wherein the performance statistical data of the neighbor relationship adjustment includes one or more data of the number of PCI conflict cells, the number of unknown PCIs triggered by an event or periodically, the number of new unknown neighbor cells triggered by an event, the number of successful handover of a new unknown neighbor cell, the number of handover target cells as conflict cells, the number of overshoot coverage cells, the number of reading a GCI, the number of successfully reading a GCI, the number of UEs specified to perform automatic neighbor relationship measurement, delay or average delay of reading a GCI, the number of neighbor cells in an NCL, and the number of NRTs.

In this embodiment, PCI is a unique serial number allocated to a cell when a network is planned, as an automatic neighbor relationship adjustment function, ANR need to ensure uniqueness of the serial number, otherwise, handover or reselection may fail. Consequently, capability of avoiding PCI conflicts among multiple adjacent cells may be used as a main indicator for measuring ANR performance. A method for obtaining the number of PCI conflicts in this embodiment includes: counting the number of cells with PCI conflicts, which are reported by the UE, in a period of ANR running time.

In addition, when moving, the UE measures all measurable cells and obtains PCIs of all the measurable cells. After the ANR runs for a period of time, the number of unknown cells is counted and reported to the network element by the UE, and the number of unknown PCIs triggered by an event or periodically is obtained. This value is used for measuring the number of new cells which may be found in a certain period of time by the ANR.

In this embodiment, if an unknown PCI of a cell is found to be conflicting with a PCI of another cell, the cell is not regarded as a new cell. In order to reflect capability of accurately "discovering a new cell", the number of new unknown neighbor cells triggered by an event, namely the number of handover that immediately occurs after a neighbor cell is found through event triggering, needs to be counted.

In this embodiment, finding a new adjacent cell does not mean that the new adjacent cell may be directly added as a neighbor cell for handover, and other factors need to be considered, so merely a part of the newly found adjacent cells "should" be added as neighbor cells; and cells, which are newly found and to which a UE can be successfully handed over, need to be counted, and this is a core function of the ANR, so the number of successful handover of a new unknown neighbor cell needs to be counted.

In this embodiment, the number of overshoot coverage cells is collected and calculated by an OAM. An overshoot coverage cell should not be a neighbor cell, but the coverage of a non-adjacent cell exceeds what is planned and reaches another cell due to a factor such as radio frequency, and these cells may be measured by a terminal or mistakenly added to a neighbor relationship to cause a handover error of a network. So these factors need to be collected and counted to measure how effective the ANR eliminating the problem.

In this embodiment, the number of reading a GCI is the number of measuring a GCI due to the ANR. Reading a GCI is a time-consuming process causing the burdens of an air interface and a network element. Reading a GCI is performed less, more air interface resources may be saved and operation delay is reduced, which means that the performance of the ANR is better.

In this embodiment, the number of neighbor cells in an NCL is the number of base station-level neighbor cells, and this statistics may be used for measuring the number of adjacent cells automatically established by the ANR and intuitively measuring the neighbor relationship establishment capability of the ANR.

In this embodiment, the number of NRTs is the number of cell-level neighbor cells, this statistics may be used for measuring the number of adjacent cells automatically established by the ANR and intuitively measuring the neighbor relationship establishment capability of the ANR, and the NRT belongs to a cell attribute.

In this embodiment, the delay/average delay of reading a GCI consumes air interface resources of a UE and further affects the UE performance, and if the delay/average delay of reading a GCI is very low and is even 0, the degradation of the current UE performance is irrelevant to the ANR.

In this embodiment, the UEs specified to perform automatic neighbor relationship measurement is UEs specified to periodically measure neighbor cells for accelerating ANR convergence. These UEs may periodically measure the neighbor cells and report data instead of measuring the neighbor cells during handover, which is quick ANR and this function will cause degradation of the UE performance. Generally, the upper limit of this function is that: taken together, no more than 20 UEs are selected to perform periodical ANR measurement and report, or no more than 5 UEs are selected to perform periodical ANR measurement and report at the same time. If this indicator is very low and is even 0, the UE resources are not occupied due to the quick ANR function, and the degradation of the UE performance is irrelevant to the ANR.

In this embodiment, the obtaining the performance of the neighbor relationship adjustment according to the performance statistical data of the neighbor relationship adjustment includes: obtaining the performance of the neighbor relationship adjustment according to first statistical data in the statistical data, wherein the first statistical data of the neighbor relationship adjustment includes one or more data of the number of PCI conflict cells, the number of unknown PCIs triggered by an event an periodically, the number of handover target cells as conflict cells, the number of successful handover of a new unknown neighbor cell, the number of overshoot coverage cells, and the number of reading a GCI.

In this embodiment, the obtaining the degree to which the neighbor relationship adjustment affects the network performance according to the statistical data includes: obtaining the degree to which the neighbor relationship adjustment affects the network performance according to second statistical data in the statistical data. Further, the obtaining the impact of the neighbor relationship adjustment on the network performance according to the second statistical data of the neighbor relationship adjustment specifically includes: obtaining difference between impact of the neighbor relationship adjustment on the network performance and impact of another self-organizing network optimization on the network performance according to the second statistical data of the neighbor relationship adjustment, wherein the second statistical data of the neighbor relationship adjustment includes one or more data of the number of PCI conflict cells, the number of unknown PCIs triggered by an event and periodically, the number of handover target cells as conflict cells, the number of successful handover of a new unknown neighbor cell, the number of overshoot coverage cells, and the number of reading a GCI.

Further, in this embodiment, when the second statistical data includes one or more data of the number of PCI conflict cells, the number of handover target cells as conflict cells, the number of new unknown neighbor cells triggered by an event and the number of unknown PCIs triggered by an event and periodically, difference between impact of the neighbor relationship adjustment on a network and impact of a mobility optimization function on the network is obtained according to the second statistical data, or a problem of the network performance is caused by the neighbor relationship adjustment or mobility adjustment is determined according to the second statistical data. Since the ANR adjusts the neighbor relationship of cells/base stations and directly acts on the designation of a target cell during handover or reselection, the ANR directly affects the mobility performance; and whether failure or abnormity in handover or movement is caused by the ANR adjustment needs to be determined.

Further, in this embodiment, the obtaining the impact of the neighbor relationship adjustment on the network performance according to the statistical data specifically includes: obtaining an evaluation parameter of impact of the neighbor relationship adjustment on UE performance, user experience or user quality of service according to the second statistical data in the statistical data, wherein the second statistical data of the neighbor relationship adjustment includes one or more data of the number of overshoot coverage cells, the number of reading a GCI, the number of successfully reading a GCI, delay or average delay of reading a GCI and the number of UEs specified to perform automatic neighbor relationship measurement. In this embodiment, if overshoot coverage exists, interference exists, the UE performance is directly affected, it can be judged that this performance degradation is not caused by the neighbor relationship adjustment. A overshoot coverage cell is a neighbor cell and cannot be removed; and a flag is added to the overshoot coverage neighbor cell for distinguishing the overshoot coverage neighbor cell from other neighbor cells, wherein the neighbor cell with the flag is named as a special neighbor cell. Reading a GCI and the delay/average delay of reading a GCI consume air interface resources of the UE and further affect the UE performance; if the number of reading a GCI is very low and is even 0, the degradation of the current UE performance is irrelevant to the ANR. If the number of UEs specified to perform automatic neighbor relationship measurement is very low and is even 0, the UE resources are not occupied by the ANR function, such as specifying a UE to periodically measure a neighbor cell, and the degradation of the performance is irrelevant to the ANR. As mentioned above, when the UE finds a new neighbor cell or an unknown PCI, new operations, such as measurement and report, addition of a neighbor cell, and handover indication, need to be added, these operations lead to delay, and the delay affects terminal performance or quality of service (QoS), so the delay may be used to measure the impact of the ANR on the terminal performance or user experience, which is also a measuring indicator of the ANR performance.

203, controlling working state of the neighbor relationship adjustment according to the obtained statistical data.

In this embodiment, statistical data of the neighbor relationship adjustment in the statistical data may be used as an optimizing target (SON Target) of the ANR, and a trigger threshold of activating or terminating the ANR operation may be controlled through setting one or more of these indicators, namely the specified statistical data. After the ANR is started, the indicators are monitored, and if one or all of the indicators is/are achieved or satisfaction degree achieves a specified satisfaction degree, for example, 80% of the indicators meet 80% of average requirements, the ANR may be terminated; and after the ANR is terminated, the indicators are monitored, and if one or all of the indicators is/are not achieved or the satisfaction degree does not achieve the specified satisfaction degree, for example, 80% of the indicators do not meet 80% of average requirements, the ANR is activated. Optionally, in this embodiment, the statistical data may be used as a statistical item of performance measurement PM, wherein the function of the PM may be the same as or similar to the function of the SON Target, and the PM will not be repeated redundantly in this embodiment.

Optionally, a first preset condition may be set in this embodiment; when specified data in the statistical data of the neighbor relationship adjustment exceeds the first preset condition, a neighbor cell relationship adjustment algorithm is terminated; when the specified data in the statistical data of the neighbor relationship adjustment is lower than the first preset condition, the neighbor relationship adjustment algorithm is activated, wherein under the first preset condition, the statistical data of the neighbor relationship adjustment includes one or more of the number of PCI conflicts, the number of unknown PCIs triggered by an event and periodically, the number of new unknown neighbor cells triggered by an event, the number of handover target cells as conflict cells, the number of overshoot coverage cells, and the number of reading a GCI; after the first preset condition is set, if statistical data specified by the first preset condition exceeds the first preset condition, the ANR algorithm is terminated; and when the statistical data specified by the first preset condition is lower than the first preset condition, the ANR algorithm is activated again.

Optionally, when specified data in the statistical data of the neighbor relationship adjustment exceeds a second preset condition, the neighbor relationship adjustment algorithm is terminated; when the specified data in the statistical data of the neighbor relationship adjustment is lower than the second preset condition, the neighbor relationship adjustment algorithm is activated, wherein the statistical data of the neighbor relationship adjustment includes one or more of the number of overshoot coverage cells, the number of reading a GCI, the number of successfully reading a GCI, delay and/or average delay of reading a GCI, and the number of UEs specified to perform automatic neighbor relationship measurement.

Optionally, when specified data in the statistical data of the neighbor relationship adjustment is lower than a third preset condition, the neighbor relationship adjustment algorithm is terminated; when the specified data in the statistical data of the neighbor relationship adjustment exceeds the third preset condition, the neighbor relationship adjustment algorithm is activated, wherein the statistical data of the neighbor relationship adjustment includes one or more of the number of successful handover of a new unknown neighbor cell, the number of neighbor cells in an NCL, and the number of NRTs.

In this embodiment, an operator may adjust the first preset condition, the second preset condition or the third preset condition through an experience value or performance of the current network, which is not specifically limited in this embodiment.

Further, in this embodiment, for the impact of the statistical data of the neighbor relationship adjustment on the network performance, namely impact on HO (hand over) performance, impact on the UE performance or the QoS, the operator may set an impact evaluation threshold, and the evaluation threshold is used for coordinating the relationship between the ANR and other important functions, such as coordinating the relationship between the ANR and high-priority service, or between the ANR and an important function of a VIP user in a cell. As the ANR function may have affected other functions or will affect the other functions, such as degrading or promoting of the performance of the network or the UE, in order to reduce the impact of the ANR on the other functions, the operator may set a trigger threshold. When the statistical data of the ANR reaches the trigger threshold, the ANR function is terminated to ensure normal operation of the other functions; and when the statistical data of the ANR is lower than the trigger threshold, the ANR is restarted, wherein the trigger threshold includes the aforementioned first preset condition, second preset condition or third preset condition, which is not specifically limited in this embodiment.

In this embodiment, specifically, an indicator for ANR target measurement may be added to an existing network management architecture by the operator, and may also be used for triggering the start or end of the ANR or measuring impact which needs to be considered in coordination related to the ANR, so as to decide how to perform coordination control on the ANR. Table 1 shows target definitions of an SON (self-organizing network):

TABLE 1

| Attribute Name | Definition | Legal Values |
| --- | --- | --- |
| The number of PCI conflict cells | For counting the number of cells with new PCIs that are found by ANR and conflict with existing PCIs, this indicator is an integer variable, and is used for ANR or coordination related to ANR | 0 . . . 32 |
| The number of | For counting the number of cells with | 0 . . . 32 |

TABLE 1-continued

| Attribute Name | Definition | Legal Values |
|---|---|---|
| unknown PCIs triggered by an event/ periodically | new PCIs found by ANR, this indicator is an integer variable, and is used for ANR or coordination related to ANR | |
| The number of handover target cells as conflict cells | The number of handover target cells with PCIs that conflict with existing PCIs, where the PCI conflict is caused by adding an improper cell as a handover neighbor cell by ANR, this indicator is an integer variable, and is used for ANR or coordination related to ANR | 0 . . . 32 |
| (event-triggered) The number of new unknown neighbor cells (the number of successful handover immediately occurs after neighbor cells are found by an event triggering) | After an unknown PCI is found, if the PCI conflicts with or is as same as an existing PCI, a cell with the PCI cannot be regarded as a new cell, this indicator reflects new cell discovery capability of ANR more accurately, and this indicator is an integer variable, and is used for ANR or coordination related to ANR | 0 . . . 65535 |
| The number of successful handover of a new unknown neighbor cell (the number of successful handover, which immediately occurs after finding a neighbor cell by triggered by an event) | For measuring the number of successful handover occurring in cells which may be successfully used for handover after a new neighbor cell is added by ANR, this indicator shows that the added neighbor cell is reasonable and successful, this indicator is an integer variable, and is used for ANR or coordination related to ANR | 0 . . . 65535 |
| The number of overshoot coverage cells (OAM statistic) | An overshoot coverage cell is a non-adjacent cell, which should not be a neighbor cell, but coverage of which exceeds what is planned and reaches another cell due to a factor such as radio frequency, and these cells may be measured by a terminal or mistakenly added to a neighbor relationship to cause a handover error of a network. | 0 . . . 32 |
| The number of reading a CGI (measuring a GCI due to ANR) | The number of reading a CGI by a UE for an ANR function, this indicator is an integer variable, and is used for ANR or coordination related to ANR | 0 . . . 65535 |
| The number of neighbor cells of an NCL (number of base station-level neighbor cells) | The number of cells that are adjacent a base station and automatically established by ANR, this indicator is an integer variable, and is used for ANR or coordination related to ANR | 0 . . . 128 |
| The number of NRTs (the number of cell-level neighbor cells) | The number of cells that are adjacent to a cell and automatically established by ANR, this indicator is an integer variable, and is used for ANR or coordination related to ANR | 0 . . . 32 |
| The number of UEs specified to perform automatic neighbor relationship measurement | In order to accelerate ANR convergence, UEs need to be specified to periodically measure neighbor cells, these UEs may periodically measure the neighbor cells and report data instead of measuring the neighbor cells during handover, which is quick ANR; and this indicator is used to count the number of the specified UEs; this indicator is an integer variable, and is used for ANR or coordination related to ANR | 0 . . . 65535 |

In Table 1, the attribute definition shows purpose of each characteristic value, ranges of the legal values limits corresponding value ranges of attributes, and a threshold in Table 1 may be set by an operator, which is not specifically limited in this embodiment. The ranges of the legal values may be optional and used for defining the effective value ranges of the attributes, and both of the ranges of the legal values and the attributes are not necessary at the same time.

This embodiment has the following beneficial effects: the statistical data characterizing the network performance is obtained, and the performance of the neighbor relationship adjustment or the degree to which the neighbor relationship adjustment affects the network performance is obtained according to the statistical data, so that impact of ANR algorithm on a network or a UE is determined by collecting related status data, the problem that whether the degradation of the UE performance or the user experience is caused by the ANR algorithm cannot be determined in the prior art is solved, then a factor of ANR operation may be excluded from numerous factors which may affect a system or user experience, analysis capability of automatic troubleshooting is improved, and problem solving capability of an operator is improved. Further, the operator may set a trigger threshold, quantify the degree to which the ANR function affects other network optimization functions and further the coordination between the ANR and the other optimization functions may be better controlled.

Embodiment 3

Figure 3:
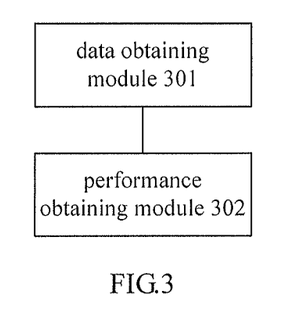
FIG. 3 is a schematic diagram of a device for evaluating network performance according to embodiment 3 of the present application.

Please refer to FIG. 3, a device for evaluating network performance is provided in the embodiment. The device includes a data obtaining module 301 and a performance obtaining module 302.

The data obtaining module 301 is configured to obtain statistical data characterizing network performance;

the performance obtaining module 302 is configured to obtain performance of neighbor relationship adjustment or obtain a degree to which the neighbor relationship adjustment affects the network performance according to the statistical data.

Figure 4:
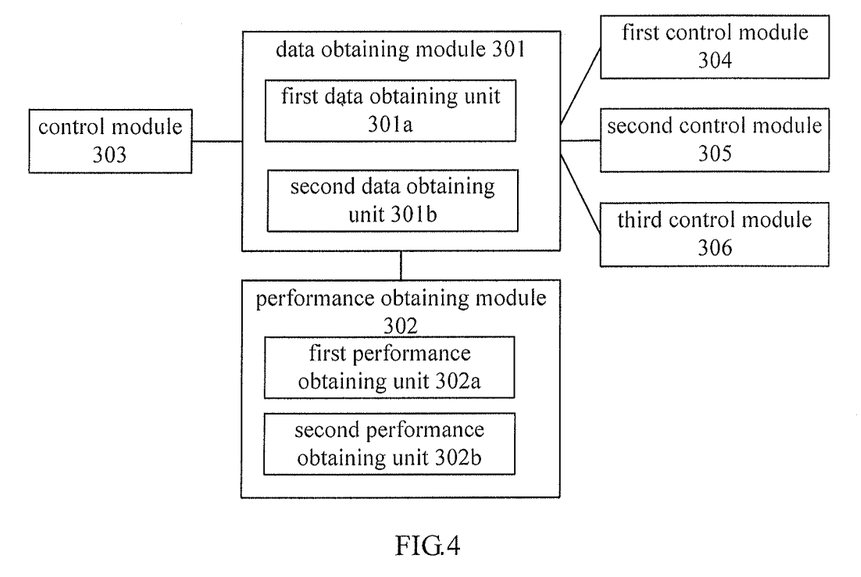
FIG. 4 is a schematic diagram of another device for evaluating network performance according to embodiment 3 of the present application.

Please refer to FIG. 4, in this embodiment, optionally, the data obtaining module 301 includes:

a first data obtaining unit 301a, configured to receive telephone traffic data, neighbor relationship data or coverage data reported by a user equipment UE, or collect telephone traffic data, neighbor relationship data or coverage data from a network element, and obtain the statistical data characterizing the network performance according to the telephone traffic data, the neighbor relationship data or the coverage data;

or, a second data obtaining unit 301b, configured to receive the statistical data characterizing the network performance, which is reported by a UE and/or a network element, wherein the statistical data are obtained by the UE and/or the network element according to telephone traffic data, neighbor relationship data or coverage data.

Optionally, in this embodiment, the statistical data is obtained by the UE through measurement and calculation and then reported to a network side by the UE, where after the UE reads the statistical data, the statistical data is stored in the UE, and after the UE is connected to a network, the statistical data is reported to the network side; or when the UE is connected to a network, the statistical data is obtained by the UE through measurement and calculation, and reported to the network side.

Optionally, in this embodiment, the first data obtaining unit 301a includes:

a counting subunit, configured to receive the telephone traffic data, the neighbor relationship data or the coverage data reported by the UE, or collect the telephone traffic data, the neighbor relationship data or the coverage data from the network element, and accumulatively count the telephone traffic data, the neighbor relationship data or the coverage data to obtain the statistical data characterizing the network performance.

Figure 5:
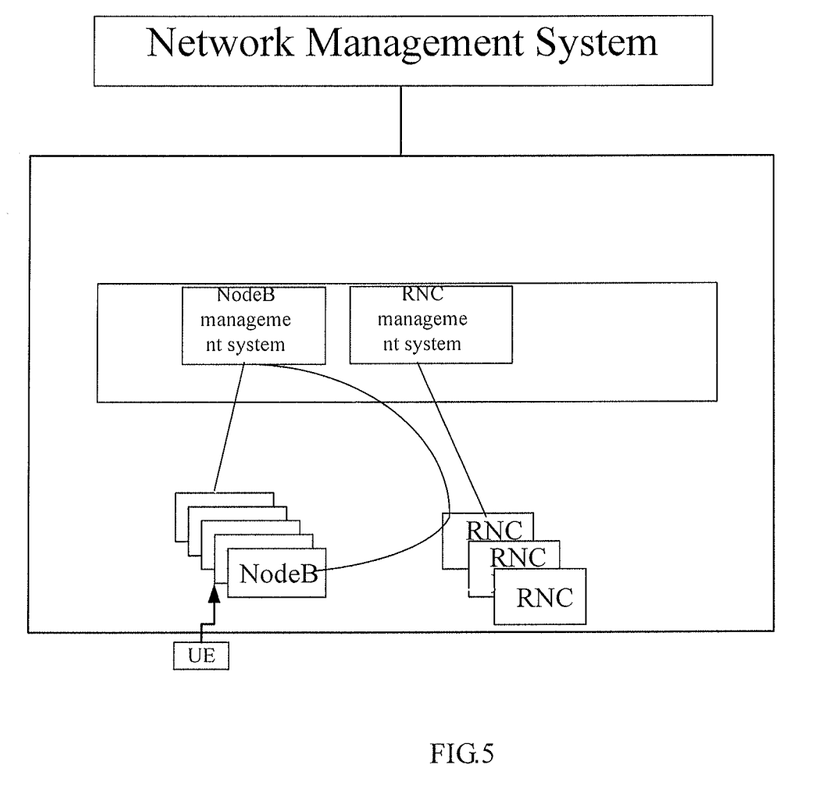
FIG. 5 is a schematic diagram of a network structure according to embodiment 3 of the present application.

In this embodiment, with reference to a network structure shown in FIG. 5, a specific algorithm for obtaining the statistical data characterizing the network performance may be adopt a performance statistics and periodically monitor the statistics by using a PM structure of a network management, or may adopt a UE measured value directly reported by a UE and finally reported to a network management system. Performance data may be reported from the network element (such as a NodeB or an RNC), and specifically, a corresponding counter for counting the required data may be configured on the network element (such as a Node or an RNC).

Optionally, in this embodiment, the statistical data includes one or more data of the number of physical cell identifier PCI conflict cells, the number of unknown PCIs triggered by an event and periodically, the number of new unknown neighbor cells triggered by an event, the number of successful handover of a new unknown neighbor cell, the number of handover target cells as conflict cells, the number of overshoot coverage cells, the number of reading a global cell identity GCI, the number of successfully reading a GCI, the number of UEs specified to perform automatic neighbor relationship measurement, delay or average delay of reading a GCI, the number of neighbor cells in an NCL, and the number of NRTs.

Please refer to FIG. 4, optionally, in this embodiment, one or more data in the statistical data may form a preset condition for measuring whether the neighbor relationship adjustment achieves an operating requirement target or meets a specified requirement of the neighbor relationship adjustment, and the device also includes:

a control module 303, configured to, according to the preset condition, judge whether the neighbor relationship adjustment achieves the operating requirement target, or measure a degree to which the neighbor relationship adjustment meets the specified requirement;

if the operating requirement target is achieved or the specified requirement is met, the neighbor relationship adjustment is terminated, otherwise, the neighbor relationship adjustment is activated, or the neighbor relationship adjustment which has been started is continued.

Please refer to FIG. 4, optionally, in this embodiment, the performance obtaining module 302 includes:

a first performance obtaining unit 302a, configured to obtain the performance of the neighbor relationship adjustment according to first statistical data in the statistical data.

Where, the first statistical data includes one or more data of the number of PCI conflict cells, the number of unknown PCIs triggered by an event and periodically, the number of handover target cells as conflict cells, the number of successful handover of a new unknown neighbor cell, the number of overshoot coverage cells, the number of neighbor cells in an NCL, the number of NRTs, and the number of reading a GCI.

Please refer to FIG. 4, optionally, in this embodiment, the performance obtaining module 302 includes:

a second performance obtaining unit 302b, configured to obtain the degree to which the neighbor relationship adjustment affects the network performance according to second statistical data in the statistical data.

Optionally, in this embodiment, the second performance obtaining unit 302b includes:

a first performance obtaining subunit, configured to obtain difference between impact of the neighbor relationship adjustment on the network performance and impact of another self-organizing network optimization on the network performance according to the second statistical data in the statistical data.

Where, the second statistical data includes one or more data of the number of PCI conflict cells, the number of unknown PCIs triggered by an event or periodically, the number of handover target cells as conflict cells, the number of successful handover of a new unknown neighbor cell, the number of overshoot coverage cells, the number of reading a GCI, the number of successfully reading a GCI, the delay/average delay of reading a GCI, and the number of UEs specified to perform automatic neighbor relationship measurement.

Optionally, in this embodiment, the first performance obtaining subunit is further configured to:

obtain difference between impact of the neighbor relationship adjustment on a network and impact of a mobility optimization function on the network influence according to the second statistical data; or determine that a problem of the network performance is caused by the neighbor relationship adjustment or mobility adjustment according to the second statistical data, when the second statistical data includes one or more data of the number of PCI conflict cells, the number of handover target cells as conflict cells, the number of new unknown neighbor cells triggered by an event, and the number of unknown PCIs triggered by an event and periodically.

Optionally, in this embodiment, the second performance obtaining unit 302b includes:

a second performance obtaining subunit, configured to obtain an evaluation parameter of impact of the neighbor relationship adjustment on UE performance, user experience or user quality of service according to the second statistical data in the statistical data.

Where, the second statistical data includes one or more data of the number of overshoot coverage cells, the number of reading a GCI, the number of successfully reading a GCI, the delay or average delay of reading a GCI, and the number of UEs specified to perform automatic neighbor relationship measurement.

Please refer to FIG. 4, optionally, in this embodiment, when the statistical data includes one or more indicators of the number of PCI conflict cells, the number of unknown PCIs triggered by an event or periodically, the number of new unknown neighbor cells triggered by an event, the number of handover target cells as conflict cells, the number of overshoot coverage cells, the number of reading a GCI, and the number of successfully reading a GCI, the device further includes:

a first control module 304, configured to, when specified data in the statistical data exceeds a first preset condition, terminate neighbor relationship adjustment algorithm;

when the specified data in the statistical data is lower than the first preset condition, the first control module 304 is further configured to activate the neighbor relationship adjustment algorithm.

Please refer to FIG. 4, optionally, in this embodiment, when the statistical data includes one or more indicators of the number of overshoot coverage cells, the number of reading a GCI, the number of successfully reading a GCI, the delay and/or average delay of reading a GCI, and the number of UEs specified to perform automatic neighbor relationship measurement, the device further includes:

a second control module 305, configured to, when specified data in the statistical data exceeds a second preset condition, terminate neighbor relationship adjustment algorithm;

when the specified data in the statistical data is lower than the second preset condition, the second control module is further configured to activate the neighbor relationship adjustment algorithm, or to continue the neighbor relationship adjustment algorithm.

Please refer to FIG. 4, optionally, in this embodiment, when the statistical data includes one or more indicators of the number of successful handover of a new unknown neighbor cell, the number of neighbor cells in an NCL, and the number of NRTs, the device further includes:

a third control module 306, configured to, when specified data in the statistical data is lower than a third preset condition, terminate neighbor relationship adjustment algorithm;

when the specified data in the statistical data exceeds the third preset condition, the third control module is further configured to activate the neighbor relationship adjustment algorithm, or to continue the neighbor relationship adjustment algorithm.

Optionally, in this embodiment, the statistical data is a self-organizing network target (SON target), or the statistical data is a statistical item of performance measurement (PM).

This embodiment has the following beneficial effects: the statistical data characterizing the network performance is obtained, and the performance of the neighbor relationship adjustment or the degree to which the neighbor relationship adjustment affects the network performance is obtained according to the statistical data, so that impact of ANR algorithm on a network or a UE is determined by collecting related status data, and a problem that whether degradation of UE performance or user experience is caused by the ANR algorithm cannot be determined in the prior art is solved, then a factor of ANR operation may be excluded from numerous factors which may affect a system or user experience, analysis capability of automatic troubleshooting is improved, and problem solving capability of operators is improved.

In Embodiment 4, evaluation of ANR performance or impact of ANR on network performance is implemented in a performance measurement mechanism.

In this embodiment, specifically, an operator may add measurement of ANR performance or measurement of impact of ANR on network performance to an existing network management architecture, which is implemented in the performance measurement mechanism by using multiple performance indicator counters. The counters are shown in Table 2:

TABLE 2

| Counter Name | Counter Definition |
| --- | --- |
| The number of PCI conflict cells | For counting the number of cells with new PCIs that are found by ANR and conflict with existing PCIs, when a PCI conflict cell is found, the counter is increased by 1. |
| The number of unknown PCIs triggered by an event/ periodically | For counting the number of cells with new PCIs found by ANR, when a PCI conflict event occurs and one conflict cell is found, the counter is increased by 1. |

TABLE 2-continued

| Counter Name | Counter Definition |
| --- | --- |
| The number of handover target cells as conflict cells (event-triggered) | The number of handover target cells with PCIs that conflict with existing PCIs, where the PCI conflict is caused by adding an improper cell as a handover neighbor cell by ANR, when cells added by the ANR includes one such cell, the counter is increased by 1. |
| The number of new unknown neighbor cells (the number of handover immediately occurs after neighbor cells are found by an event triggering) | After an unknown PCI is found, a cell with the PCI which conflicts with or is as same as an existing PCI cannot be regarded as a new cell; in order to reflect new cell discovery capability of ANR more accurately, this indicator is used; and when a PCI of a handover neighbor cell added by ANR do not conflict with a PCI of an existing cell, the handover neighbor cell may be regarded as a new cell, and when one such cell exists, the counter is increased by 1. |
| The number of successful handover of a new unknown neighbor cell (the number of successful handover immediately occurs after neighbor cells are found by an event triggering) | For measuring the number of successful handover occurring in cells which may be successfully used for handover after a new neighbor cell is added by ANR, this indicator shows that the added neighbor cell is reasonable and successful, when one such cell is added by the ANR, the counter is increased by 1. |
| The number of overshoot coverage cells (OAM statistic) | An overshoot coverage cell is an non-adjacent cell, which should not be a neighbor cell, but coverage of which exceeds what is planned and reaches another cell due to a factor such as radio frequency, and these cells may be measured by a terminal or mistakenly added to a neighbor relationship to cause a handover error of a network, and when the neighbor relationship includes one overshoot coverage cell, the counter is increased by 1. |
| The number of reading a GCI (measuring a GCI due to ANR) | The number of reading a CGI by a UE, for an ANR function, when the UE reads a GCI once for the ANR function, the counter is increased by 1. |
| delay or average delay of reading a GCI | When a UE reads a GCI, every time the UE reads a GCI, one delay value is generated, the delay is called as delay of reading a GCI; delay mean value in a granularity period is called as average delay of reading a GCI, an average delay counter needs to accumulate the delay of reading a GCI, one delay is added every sampling, and the accumulated delay is divided by the number of reading a GCI in the granularity period to obtain the average delay of reading a GCI. |
| The number of Neighbor cells in an NCL (number of base station-level neighbor cells) | The number of cells that are adjacent to a base station and automatically established by ANR, when ANR automatically establishes an NCL of the base station, once one neighbor cell exists, the counter is increased by 1. |
| The number of NRTs (the number of cell-level neighbor cells) | The number of cells that are adjacent to a cell and automatically established by ANR, when ANR automatically establishes an NRT of the cell, once one neighbor cell exists, the counter is increased by 1. |
| The number of UEs specified to perform automatic neighbor relationship measurement | Specifying the number of UEs periodically measuring neighbor cells for ANR, these UEs may periodically measure neighbor cells and report data instead of measuring the neighbor cells during handover, and once one such UE is specified, the counter is increased by 1. |

The device provided in this embodiment may specially belong to the same conception as the embodiments of the method, and the specific implementation process of the device is illustrated as the embodiments of the method and will not be repeated redundantly herein.

Persons of ordinary skill in the art may understand that, all or a part of the steps in the aforementioned embodiments may be implemented by hardware or by a program instructing relevant hardware. The program may be stored in a computer readable storage medium, and the storage medium may be a read-only memory, a magnetic disk, an optical disk, or the like.

The foregoing descriptions are merely exemplary embodiments of the present application, and are not intended to limit the present application. Any modification, equivalent replacement, or improvement made within the principle of the present application shall all fall within the protection scope of the present application.

What is claimed is:

1. A method for evaluating network performance, comprising:
   obtaining statistical data characterizing network performance, wherein the statistical data comprises the number of unknown physical cell identifiers (PCIs) triggered by an event or periodically; and
   obtaining performance of automatic neighbor relationship adjustment according to the statistical data, or obtaining a degree to which the automatic neighbor relationship adjustment affects the network performance according to the statistical data, wherein the automatic neighbor relationship adjustment is used to automatically discover, add and delete a neighbor cell and the number of unknown PCIs is used to indicate the number of cells with new PCIs found by the automatic neighbor relationship adjustment;
   wherein one or more data in the statistical data forms a preset condition for measuring whether the automatic neighbor relationship adjustment achieves an operating requirement target or meets a specified requirement of the automatic neighbor relationship adjustment, and the method further comprises:
   judging whether the automatic neighbor relationship adjustment achieves the operating requirement target according to the preset condition, or measuring a degree to which the automatic neighbor relationship adjustment meets the specified requirement according to the preset condition;
   if the operating requirement target is achieved or the specified requirement is met, terminating the automatic neighbor relationship adjustment; and
   if the operating requirement target is not achieved or the specified requirement is not met, activating the automatic neighbor relationship adjustment, or continuing the automatic neighbor relationship adjustment which has been started.

2. The method according to claim 1, wherein the obtaining statistical data characterizing network performance comprises:
   receiving telephone traffic data, neighbor relationship data or coverage data reported by a user equipment (UE), and obtaining the statistical data characterizing the network performance according to the telephone traffic data, the neighbor relationship data or the coverage data;
   collecting telephone traffic data, neighbor relationship data or coverage data from a network element, and obtaining the statistical data characterizing the network performance according to the telephone traffic data, the neighbor relationship data or the coverage data; or
   receiving the statistical data characterizing the network performance reported by a UE and/or a network element, wherein the network element comprises a base station or a maintenance and management unit.

3. The method according to claim 1, wherein the obtaining performance of automatic neighbor relationship adjustment according to the statistical data comprises:
   obtaining the performance of the automatic neighbor relationship adjustment according to first statistical data in the statistical data, wherein the first statistical data comprises one or more of the following data: the number of PCI conflict cells, the number of unknown PCIs triggered by an event or periodically, the number of handover target cells as conflict cells, the number of successful handover of a new unknown neighbor cell, the number of overshoot coverage cells, the number of neighbor cells in an NCL, the number of NRTs, and the number of reading a GCI.

4. The method according to claim 1, wherein the obtaining a degree to which the automatic neighbor relationship adjustment affects the network performance according to the statistical data comprises:
   obtaining the degree to which the automatic neighbor relationship adjustment affects the network performance according to second statistical data in the statistical data.

5. The method according to claim 4, wherein the obtaining the degree to which the automatic neighbor relationship adjustment affects the network performance according to second statistical data in the statistical data comprises:
   obtaining difference between impact of the automatic neighbor relationship adjustment on the network performance and impact of another self-organizing network optimization on the network performance according to the second statistical data in the statistical data, wherein the second statistical data comprises one or more of the following data: the number of PCI conflict cells, the number of unknown PCIs triggered by an event or periodically, the number of handover target cells as conflict cells, the number of successful handover of a new unknown neighbor cell, the number of overshoot coverage cells, the number of reading a GCI, the number of successfully reading a GCI, the delay/average delay of reading a GCI, and the number of UEs specified to perform automatic neighbor relationship measurement.

6. The method according to claim 4, wherein the obtaining the degree to which the automatic neighbor relationship adjustment affects the network performance according to second statistical data in the statistical data comprises:
   obtaining difference between impact of the automatic neighbor relationship adjustment on a network and impact of a mobility optimization function on the network according to the second statistical data, or determining that a problem of the network performance is caused by the automatic neighbor relationship adjustment or mobility adjustment according to the second statistical data, wherein the second statistical data comprises one or more data of the number of PCI conflict cells, the number of handover target cells as conflict cells, the number of new unknown neighbor cells triggered by an event, and the number of unknown PCIs triggered by an event or periodically.

7. The method according to claim 4, wherein the obtaining the degree to which the automatic neighbor relationship adjustment affects the network performance according to second statistical data in the statistical data comprises:

obtaining an evaluation parameter of impact of the automatic neighbor relationship adjustment on UE performance, user experience or user quality of service according to the second statistical data in the statistical data, wherein the second statistical data comprises one or more of the following data: the number of overshoot coverage cells, the number of reading a GCI, the number of successfully reading a GCI, the delay or average delay of reading a GCI, and the number of UEs specified to perform automatic neighbor relationship measurement.

8. The method according to claim 1, wherein the statistical data is a self-organizing network target (SON target), or the statistical data is a statistical item of performance measurement (PM).

9. The method according to claim 1, wherein the statistical data further comprises at least one of the following data: the number of PCI conflict cells, the number of new unknown neighbor cells triggered by an event, the number of successful handover of a new unknown neighbor cell, the number of handover target cells as conflict cells, the number of overshoot coverage cells, the number of reading a global cell identity (GCO), the number of successfully reading a GCI, the number of UEs specified to perform automatic neighbor relationship measurement, delay or average delay of reading a GCI, the number of neighbor cells in a neighbor cell list (NCL), and the number of neighbor relationship tables (NRTs).

10. A device for evaluating network performance, comprising a processing hardware platform executing instructions stored on a non-transitory computer-readable storage medium functions as a plurality of modules, the plurality of modules comprising:
a data obtaining module, configured to obtain statistical data characterizing network performance, wherein the statistical data comprises the number of unknown physical cell identifiers (PCIs) triggered by an event or periodically; and
a performance obtaining module, configured to obtain performance of automatic neighbor relationship adjustment according to the statistical data, or obtain a degree to which the automatic neighbor relationship adjustment affects the network performance according to the statistical data, wherein the automatic neighbor relationship adjustment is used to automatically discover, add and delete a neighbor cell and the number of unknown PCIs is used to indicate the number of cells with new PCIs found by the automatic neighbor relationship adjustment;
wherein one or more data in the statistical data forms a preset condition for measuring whether the automatic neighbor relationship adjustment achieves an operating requirement target or meets a specified requirement of the automatic neighbor relationship adjustment, and the plurality of modules further comprises:
a control module, configured to judge whether the automatic neighbor relationship adjustment achieves the operating requirement target according to the preset condition, or to measure a degree to which the automatic neighbor relationship adjustment meets the specified requirement according to the preset condition; wherein,
if the operating requirement target is achieved or the specified requirement is met, the control module is further configured to terminate the automatic neighbor relationship adjustment; and
if the operating requirement target is not achieved or the specified requirement is not met, the control module is further configured to activate the automatic neighbor relationship adjustment, or to continue the automatic neighbor cell relationship adjustment which has been started.

11. The device according to claim 10, wherein the data obtaining module comprises:
a first data obtaining unit, configured to receive telephone traffic data, neighbor relationship data or coverage data reported by a user equipment (UE), and obtain the statistical data characterizing the network performance according to the telephone traffic data, the neighbor relationship data or the coverage data, or configured to collect, from a network element, telephone traffic data, neighbor relationship data or coverage data, and obtain the statistical data characterizing the network performance according to the telephone traffic data, the neighbor relationship data or the coverage data; or
a second data obtaining unit, configured to receive the statistical data characterizing the network performance reported by a UE and/or a network element, wherein the network element comprises a base station or a maintenance and management unit.

12. The device according to claim 10, wherein the performance obtaining module comprises:
a first performance obtaining unit, configured to obtain the performance of the automatic neighbor relationship adjustment according to first statistical data in the statistical data, wherein the first statistical data comprises one or more of the following data: the number of PCI conflict cells, the number of unknown PCIs triggered by an event or periodically, the number of handover target cells as conflict cells, the number of successful handover of a new unknown neighbor cell, the number of overshoot coverage cells, the number of neighbor cells in an NCL, the number of NRTs, and the number of reading a GCI.

13. The device according to claim 10, wherein the performance obtaining module comprises:
a second performance obtaining unit, configured to obtain the degree to which the automatic neighbor relationship adjustment affects the network performance according to second statistical data in the statistical data.

14. The device according to claim 13, wherein the second performance obtaining unit is configured to obtain difference between impact of the automatic neighbor relationship adjustment on the network performance and impact of another self-organizing network optimization on the network performance according to the second statistical data in the statistical data, wherein the second statistical data comprises one or more of the following data: the number of PCI conflict cells, the number of unknown PCIs triggered by an event or periodically, the number of handover target cells as conflict cells, the number of successful handover of a new unknown neighbor cell, the number of overshoot coverage cells, the number of reading a GCI, the number of successfully reading a GCI, the delay/average delay of reading a GCI, and the number of UEs specified to perform automatic neighbor relationship measurement.

15. The device according to claim 13, wherein the second performance obtaining unit is configured to obtain difference between impact of the automatic neighbor relationship adjustment on a network and impact of a mobility optimization function on the network according to the second statistical data, or determine that a problem of the network performance is caused by the automatic neighbor relationship adjustment or mobility adjustment according to the second statistical data, wherein the second statistical data comprises one or more data of the number of PCI conflict cells, the number of handover target cells as conflict cells, the number of new unknown neighbor cells triggered by an event, and the number of unknown PCIs triggered by an event or periodically.

16. The device according to claim 13, wherein the second performance obtaining unit is configured to obtain an evaluation parameter of impact of the automatic neighbor relationship adjustment on UE performance, user experience or user quality of service according to the second statistical data in the statistical data, wherein the second statistical data include one or more of the following data: the number of overshoot coverage cells, the number of reading a GCI, the number of successfully reading a GCI, the delay or average delay of reading a GCI, and the number of UEs specified to perform automatic neighbor relationship measurement.

17. The device according to claim 10, wherein the statistical data is a self-organizing network target (SON target) or the statistical data is a statistical item of performance measurement (PM).

18. The device according to claim 10, wherein the statistical data further comprises at least one of the following data: the number of PCI conflict cells, the number of new unknown neighbor cells triggered by an event, the number of successful handover of a new unknown neighbor cell, the number of handover target cells as conflict cells, the number of overshoot coverage cells, the number of reading a global cell identity (GCO), the number of successfully reading a GCI, the number of UEs specified to perform automatic neighbor relationship measurement, delay or average delay of reading a GCI, the number of neighbor cells in a neighbor cell list (NCL), and the number of neighbor relationship tables (NRTs).

* * * * *